Oct. 29, 1957 J. J. CULLEN 2,810,916
LAVATORY
Filed Sept. 27, 1954 2 Sheets-Sheet 1
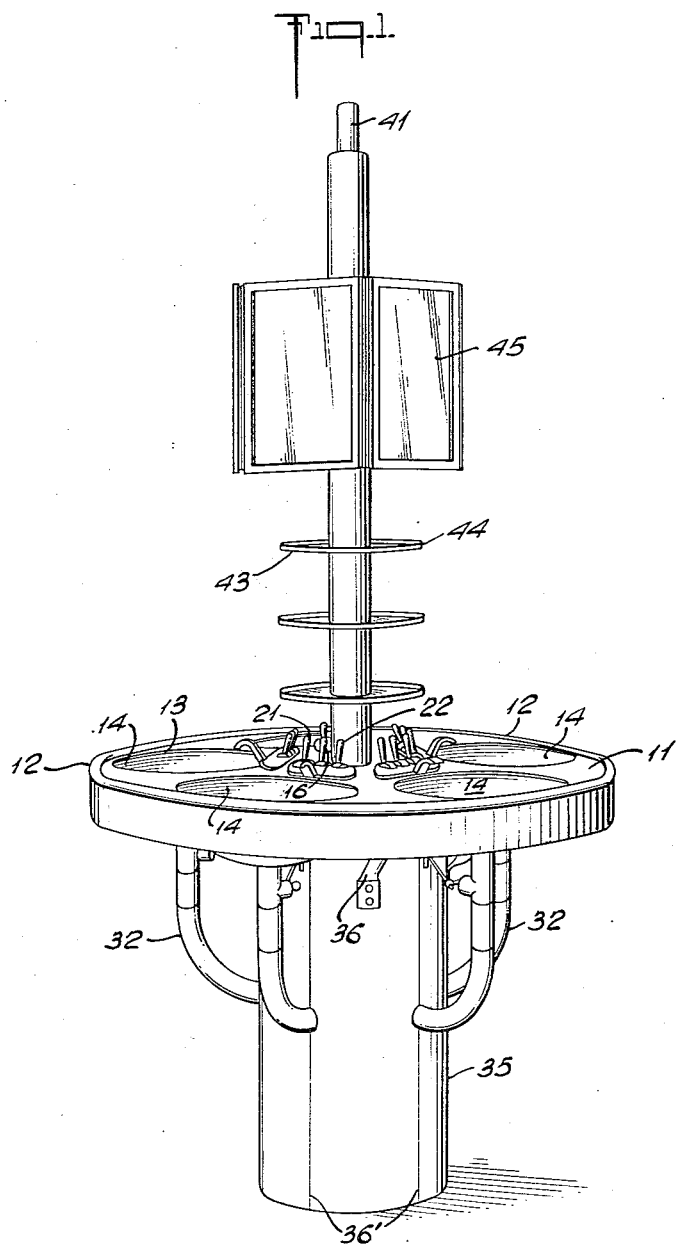
INVENTOR
JOHN J. CULLEN
By George Sipkin
Lee J. Huntzberger
ATTORNEYS Oct. 29, 1957 J. J. CULLEN 2,810,916
LAVATORY
Filed Sept. 27, 1954 2 Sheets-Sheet 2
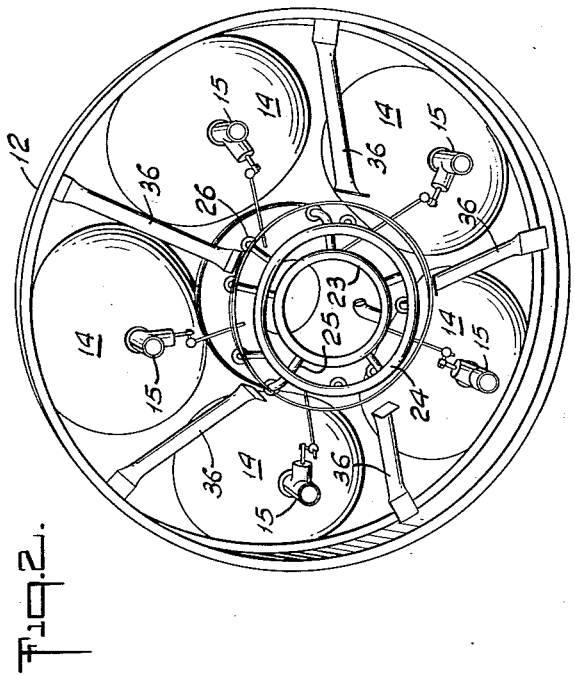
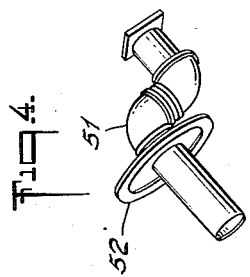
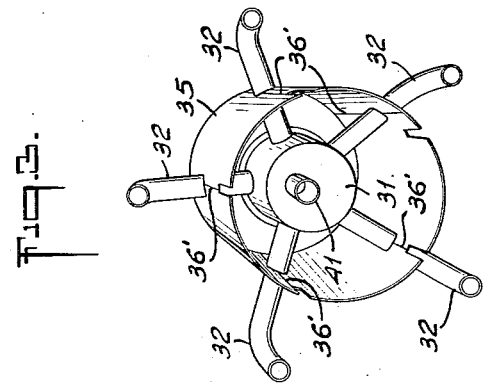
INVENTOR
JOHN J. CULLEN
By George Sipkin
Lee J. Huntzberger
ATTORNEYS

United States Patent Office 2,810,916
Patented Oct. 29, 1957

2,810,916

LAVATORY

John J. Cullen, Belmont, Mass.

Application September 27, 1954, Serial No. 458,996

1 Claim. (Cl. 4—166)

(Granted under Title 35, U. S. Code (1952), sec. 266)

The invention described herein may be manufactured and used by or for the Government of the United States of America for governmental purposes without the payment of any royalties thereon or therefor.

The present invention concerns a lavatory and particularly concerns a lavatory that is circular in shape and provides a plurality of independent basins.

In lavatories used aboard ship it is necessary to provide a maximum facility for washing in a minimum amount of space and it is necessary that the washing facility be sanitary. In the past, it has been customary to provide individual wash basins arranged in a row along a bulkhead of the ship. This has the disadvantage of requiring an excessive amount of space and of requiring an excessive amount of piping. It has therefore in the past been proposed to provide a circular wash basin in order to save space and to reduce the amount of piping in order to save space and to reduce the amount of piping involved. To this end there has in the past been provided a circular wash basin which comprises in effect a ring-shaped trough affording a community basin in which waste wash water from one person who is washing flows along the trough into the area where another person is washing. This arrangement is unsanitary because soiled water in the trough inescapably is commingled with clean water fed into the trough.

The present invention overcomes these difficulties by providing a circular lavatory in which there are individual wash basins arranged in spaced relation angularly about the lavatory. This affords a maximum washing facility in a minimum space and provides completely sanitary facilities inasmuch as the individual wash basins are entirely separate and waste water in one basin is not commingled with fresh water in another basin.

An object of the invention is to provide a lavatory.

Another object is to provide a circular lavatory occupying a minimum amount of space.

Another object is to provide a circular lavatory having individual wash basins arranged in spaced relation angularly about the lavatory whereby a maximum sanitary facility is provided.

Other objects and many of the attendant advantages of this invention will be readily appreciated as the same becomes better understood by reference to the following detailed description when considered in connection with the accompanying drawings wherein:

Fig. 1 is a perspective view of a preferred embodiment of the invention, and

Figs. 2–4 are perspective views of different subassemblies of the preferred embodiment.

In the drawings there is shown a counter 11 that is circular in shape and is provided with a peripheral upstanding rim 12 to prevent splashing of water thereover. Arranged in angularly spaced relation around counter 11 are a plurality of individual basins 14 each of which at its top is provided with a guard lip 13 formed by projection of counter 11 inwardly toward the center of the basin. Each basin is provided with a drain plug 15 and a drain plug lever 16 is mounted on counter 11 of each basin 12 with lever 16 suitably connected to drain plug 15 to open and close the latter. A hot water outlet valve 21 and a cold water outlet valve 22 are mounted on counter 11 at each basin 12. Beneath counter 11 is provided a circular hot water manifold 23 and a circular cold water manifold 24, manifolds 23 and 24 being coaxial with the axis of counter 11. Manifolds 23 and 24 are connected by suitable pipes 25 and 26 with outlet valves 21, 22.

A drain trap 31 is axially located beneath counter 11 and suitable radial pipes 32 connect drain trap 31 with drain plugs 15 for draining basins 12. A circular pedestal 35 supports counter 11 and braces 36 extend from the periphery of counter 11 to pedestal 35. Preferably pedestal 35 is formed of a series of arcuate plates 36 when joined together at 36' form circular pedestal 35.

A vent pipe 41 extends upwardly from drain trap 31 through counter 11 and upwardly therebeyond. Mounted on vent pipe 41 above counter 11 is a series of annular soap racks 43 each of which is provided with a peripheral upstanding guard rim 44 to prevent splashing of water thereover. Soap racks 43 are mounted in axial spaced relation with respect to each other and with respect to counter 11. Also mounted on vent pipe 41 above soap racks 43 is a plurality of mirrors 45 that are angularly disposed around vent pipe 41 and one of which is located above each basin 12.

As shown in Figs. 2, 3, and 4, the lavatory is comprised of three different subassemblies so that it can be fabricated into such subassemblies in the shop and easily installed aboard the ship. Also for purposes of disassembly, the three subassemblies are convenient.

Fabrication of the lavatory occurs in a shop by forming counter 11 together with basins 12, drain plugs 15 and water manifolds 23 and 24 together with braces 36 in a subassembly (Fig. 2). Likewise drain trap 31 together with radial drain pipes 32, trap 31 and vent pipe 41 is preformed in a second subassembly (Fig. 3). The third subassembly is prefabricated comprising the main drain stack 51 and the bottom 52 of trap 31 (Fig. 4).

These subassemblies are joined aboard ship in the space where the lavatory is to be mounted by first locating pedestal 35 and its related parts, then mounting counter 11 and its related parts thereon and then connecting stack 51. The parts are then connected with a water supply (not shown).

Obviously many modifications and variations of the present invention are possible in the light of the above teachings. It is therefore to be understood that within the scope of the appended claims the invention may be practiced otherwise than as specifically described.

I claim:

A lavatory comprising a circular counter, defining an axis, a peripheral upstanding rim on said counter, a plurality of basins disposed in angularly spaced relation around said counter, said counter forming a guard lip at the top of each basin with the lip extending toward the center of the basin, a drain plug in each basin, a drain plug lever on said counter at each basin connected to open and close said drain plug, a hot water outlet valve and a cold water outlet valve on said counter at each basin, a circular hot water manifold under said counter, a circular cold water manifold under said counter, said manifolds being coaxial with said counter, pipes connecting said manifolds and outlet valves, said manifolds being adapted for connection to suitable hot and cold water sources, an axial drain trap, radial pipes connecting said drain trap and the drains of said basins, a tubular axial pedestal supporting said counter, radial braces from the counter periphery to said pedestal and (Other references on following page)

an axial vent pipe extending upwardly from said trap through said counter and thereabove.

References Cited in the file of this patent

UNITED STATES PATENTS

| | | |
|---|---|---|
| 937,509 | Carpenter | Oct. 19, 1909 |
| 969,694 | Hoffman | Sept. 6, 1910 |
| 1,323,398 | Leland | Dec. 2, 1919 |
| 1,814,352 | Watrous | July 14, 1931 |
| 1,977,079 | Mullett et al. | Oct. 16, 1934 |
| 2,310,617 | Conner | Feb. 9, 1943 |